United States Patent [19]
Kuribayashi et al.

[11] Patent Number: 5,936,934
[45] Date of Patent: Aug. 10, 1999

[54] OPTICAL DISC HAVING SUBSTRATES WITH A SPECIFIED THICKNESS/DIAMETER RATIO AND AN ADHESIVE LAYER WITH A SPECIFIED YOUNG'S MODULUS RANGE AND MECHANICAL DISSIPATION FACTOR RANGE

[75] Inventors: Isamu Kuribayashi; Hideki Hirata; Akira Itoga, all of Nagano, Japan

[73] Assignee: TDK Corporation, Japan

[21] Appl. No.: 08/917,225

[22] Filed: Aug. 25, 1997

[30] Foreign Application Priority Data

Sep. 3, 1996 [JP] Japan .................................. 8-252364

[51] Int. Cl.$^6$ ...................................................... G11B 7/24
[52] U.S. Cl. ............................................................ 369/286
[58] Field of Search ........................ 369/286; 156/275.7, 156/276, 299, 306.6, 306.9, 307.1

[56] References Cited

FOREIGN PATENT DOCUMENTS

| | | |
|---|---|---|
| 58-006536 | 1/1983 | Japan . |
| 61-110350 | 5/1986 | Japan . |
| 2-292745 | 12/1990 | Japan . |
| 2-292746 | 12/1990 | Japan . |

*Primary Examiner*—George J. Letscher
*Attorney, Agent, or Firm*—Laubscher & Laubscher; R. J. Lasker

[57] ABSTRACT

An optical disc is constructed by joining a pair of resin substrates through an adhesive layer so that information carrying means is disposed inside. The resin substrate has a diameter-to-thickness ratio $d/t \geq 180$. The adhesive layer has a Young's modulus of 0.1–1 kgf/mm$^2$ at 20° C. and a mechanical dissipation factor (tan δ) of 0.6–5.0 at 20° C. The adhesive layer is formed of a hot melt adhesive, pressure-sensitive adhesive, room temperature curable adhesive or ultraviolet curable adhesive. The disc is resistant to both heat and vibration.

7 Claims, 1 Drawing Sheet

OPTICAL DISC HAVING SUBSTRATES WITH A SPECIFIED THICKNESS/DIAMETER RATIO AND AN ADHESIVE LAYER WITH A SPECIFIED YOUNG'S MODULUS RANGE AND MECHANICAL DISSIPATION FACTOR RANGE

This invention relates to optical discs, for example, rewritable, write-once, and read-only optical discs, typically phase change type optical recording discs.

BACKGROUND OF THE INVENTION

Commercially available laser discs (LD) and 5.25-inch magneto-optic discs are constructed by providing information carrying means on a surface of a resin substrate of 1.2 mm thick and joining another resin substrate to the resin substrate with an adhesive layer so that the information carrying means is disposed inside. The adhesive layer is typically of a hot melt adhesive as disclosed in JP-A 6536/1983. Compact discs (CD) are constructed to a single substrate structure by providing information carrying means on a resin substrate of 1.2 mm thick and providing a reflective layer and a resinous protective layer thereon.

To meet the necessity to focus a laser beam at a smaller spot in order to increase the information carrying density of an optical disc, it is now attempted to use a resin substrate with a thickness of 0.6 mm. When the thickness of a resin substrate is reduced to one unit of the conventional substrate, the mechanical strength is reduced to a quarter of the conventional substrate. This prohibits the use of a single substrate as in CDs. It is thus proposed to use the construction that a pair of resin substrates are joined together as in LDs.

Optical discs comprising a pair of resin substrates of 0.6 mm thick joined together are expected to find use as digital video discs (DVD) since they have a very high information carrying density and a high capacity despite the small diameter equal to that of CDs. Because of the small diameter, the use of such optical discs in automobiles is being considered.

In order that optical discs be operated in automobiles, countermeasures must be taken against high temperature, vibration and other automotive environmental factors. Since the automotive interior can be heated to 80° C. or higher when exposed to sunlight, the adhesive for joining substrates is required to be fully heat resistant. Prior art hot melt adhesives commonly used in the optical disc field tend to soften to lower a bonding power in a hot environment, leaving the problem that optical discs lose mechanical strength.

One heat resistant adhesive is an adhesive of reaction curing type as disclosed in JP-A 110350/1986, for example. The adhesive of reaction curing type is well heat resistant in that once cured, it does not soften as do hot melt adhesives even when the surrounding temperature is elevated. Adhesives of UV curing type are often used among adhesives of the reaction curing type because they cure within a short time.

The optical discs using heat resistant adhesives, however, were found to be less stable against vibration. Since heat resistant adhesives have a high Young's modulus at about room temperature, the adhesive layer cannot accommodate the vibration transmitted to the optical disc during rotation. Vibration causes dynamic axial runout to the optical disc, giving rise to a problem upon writing/reading operation, especially upon writing operation. In particular, discs using a substrate having a greater ratio of diameter to thickness are largely affected by vibration.

It is noted that those hot melt adhesives having a high melting point are very heat resistant. They were also found to be less stable against vibration.

SUMMARY OF THE INVENTION

An object of the invention is to provide an optical disc of the structure comprising a pair of adhesively joined resin substrates having a greater ratio of diameter to thickness which is improved in both heat resistance and vibration resistance.

According to the invention, there is provided an optical disc comprising a pair of resin substrates and an information carrying means on at least one resin substrate. The pair of resin substrates are joined through an adhesive layer so that the information carrying means is disposed inside. Each of the resin substrates has a thickness t and a diameter d wherein d/t is at least 180. The adhesive layer has a Young's modulus of more than 0.1 kgf/mm$^2$ to 1 kgf/mm$^2$ at 20° C. and a mechanical dissipation factor, tanδ, of 0.6 to 5.0 at 20° C.

Typically, the adhesive layer is formed of a hot melt adhesive, pressure-sensitive adhesive, room temperature curable adhesive or ultraviolet curable adhesive.

As previously mentioned, adhesives having high heat resistance have a high Young's modulus at about room temperature. Optical discs having resin substrates joined with various adhesives were examined for stability during rotation in a vibrating environment simulating the automotive interior. It has been found that those adhesives having a high Young's modulus at about room temperature are less stable during rotation whereas those adhesives having a low Young's modulus at about room temperature absorb vibration and contribute to an improvement in rotation stability. It has also been found that a lower mechanical dissipation factor (tanδ) at about room temperature resulted in insufficient vibration absorption whereas a higher tanδ resulted in insufficient heat resistance.

Then the invention improves both heat resistance and vibration resistance by limiting certain physical properties of an adhesive as specified above.

JP-A 292745/1990 and 292746/1990 disclose hot melt adhesives having certain physical properties. These hot melt adhesives are less heat resistant because their physical properties are outside the range of the present invention.

The term "information carrying means" is used herein as encompassing both a region where information has already been carried like a pitted surface of a read-only optical disc such as CD and a recording film of an optical recording disc which can carry information.

BRIEF DESCRIPTION OF THE DRAWINGS

These and further features of the present invention will be apparent with reference to the following description and drawings, wherein.

the only FIGURE.

BEST MODE FOR CARRYING OUT THE INVENTION

Adhesive layer

Figure 1:
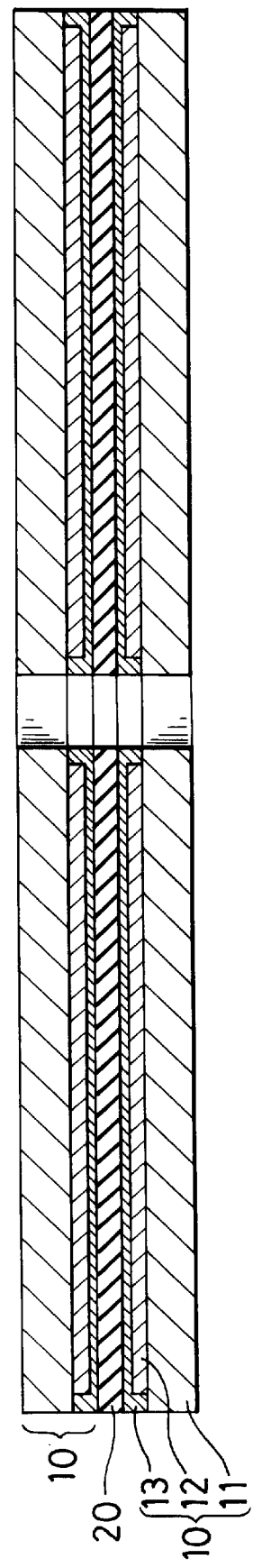
FIG. 1 is a schematic cross-sectional view of an optical disc according to the present invention.

The adhesive layer has a Young's modulus of more than 0. 1 kgf/mm$^2$ to 1 kgf/mm$^2$ at 20° C., preferably 0.12 to 1 kgf/mm² at 20° C. and a mechanical dissipation factor tanδ of 0.6 to 5.0 at 20° C., preferably 1.5 to 3.0 at 20° C. If the Young's modulus is too low or tanδ is too great, the adhesive layer becomes less heat resistant so that the optical disc might warp or tilt on use in a hot environment. More particularly, the adhesive layer becomes too soft in a hot environment and allows a displacement to occur between the resin substrates when the optical disc warps by its own weight. This warpage or tilt is fixed when room temperature is reached again, because the adhesive layer resumes its bonding power. Inversely, if the Young's modulus is too high or tanδ is too low, the adhesive layer insufficiently accommodates vibration.

The Young's modulus and mechanical dissipation factor (tanδ=loss elastic modulus/storage elastic modulus) are measured as follows. An adhesive is applied onto release paper to a thickness of 100 to 500 μm, using a roll coater, for example. If necessary, the adhesive is cured under the same conditions as in the manufacture of optical discs. After application and optional curing, the adhesive coating is stripped from the release paper as an adhesive layer sample. Using a viscoelasticity meter, the sample is measured for Young's modulus and tanδ at an exciting frequency of 10 Hz (sinusoidal wave) by a forced vibration method.

The adhesive of which the adhesive layer is constructed is not critical and may be selected from hot melt adhesives, ultraviolet curable adhesives, and room temperature curable adhesives. Pressure-sensitive adhesives are also useful.

For the hot melt adhesives, their base polymer is not critical insofar as it is tacky at room temperature. Thermoplastic block copolymerized elastomers are preferred base polymers. Preferred block components of the thermoplastic block copolymerized elastomer are polystyrene, polybutadiene, polyisoprene, and ethylene-butylene copolymers, alone or in admixture of two or more. Especially preferred are block copolymerized elastomers of a polystyrene having a molecular weight of about 2,000 to about 12,500 with a polybutadiene, polyisoprene or ethylene-butylene copolymer having a molecular weight of about 1,000 to about 250,000. The block copolymerized elastomers preferably have a molecular weight of about 3,000 to about 500,000. Other useful base polymers include synthetic rubbers such as isoprene rubber, styrene rubber, butadiene rubber, and butyl rubber, and polyolefins and polyolefinic copolymers such as polyethylene, polypropylene, and ethylene-vinyl acetate copolymers alone or in admixture of two or more.

When hot melt adhesives contain a UV curable component to be described later, they may be either used as a hot melt adhesive or polymerized by irradiation of UV and electron beams.

The UV curable adhesive contains at least a UV curable component and a photopolymerization initiator. The UV curable component is preferably an oligomer of a saturated hydrocarbon resin containing at least one acryloyl group having a double bond sensitive to UV and electron radiation in a molecule. Preferred oligomers are acrylates, urethane acrylates, epoxy acrylates, and ester acrylates of saturated hydrocarbon resin oligomers containing at least one hydroxyl or carboxyl group in a molecule such as hydrogenated polybutadiene, polybutene, hydrogenated polyisoprene, and polyisobutylene, alone or in admixture of two or more. In order that the adhesive layer as cured have a low Young's modulus at room temperature, an acrylate monomer or acrylate oligomer having a long chain molecule such as a long chain alkyl and polyol is used as the UV curable component and the proportion of the acrylate monomer or acrylate oligomer in the component is increased. Examples of the long chain molecule include caprolactone-modified 2-hydroxyethyl acrylate, polyethylene glycol diacrylate (PEG), isodecyl acrylate, and isooctyl acrylate. A low Young's modulus at room temperature is also acquired using a UV curable component based on a urethane acrylate oligomer having a polyol structure. The photopolymerization initiator may be selected from conventional photopolymerization initiators capable of generating a radical upon exposure to UV and electron radiation, for example, benzoin ethers such as benzoin isopropyl ether and benzoin isobutyl ether, benzophenones such as bezophenone, p-methoxybenzophenone, and p-bromobenzophenone, acetophenones such as benzyl methyl ketal, 2,2-diethoxyacetophenone, and 1,1-dichloroacetophenone, thioxanthones such as 2-chlorothioxanthone, quinones such as anthraquinone and phenanthraquinone, and sulfides such as benzyl disulfide and tetramethylthiuram monosulfide.

Preferred examples of the pressure-sensitive adhesive are acrylic and other base polymers having added thereto a tackifier, softener, filler, antioxidant and crosslinking agent.

It is preferred that a tackifier be contained in the hot melt adhesives and pressure-sensitive adhesives. The tackifier is preferably at least one of rosin resins, coumarone resins, hydrogenated petroleum resins, hydrogenated terpene resins, and phenolic resins. Tackifiers of the hydrogenated type are advantageous in that they are well compatible with the adhesive, do not adversely affect the thermal stability of the adhesive, and have little influence on corrosion resistance because of a low water absorption. Also preferably softeners are contained if necessary. Preferred examples of the softener include process oil, paraffin oil, polybutene, and polyisobutylene. Other additives such as plasticizers, wax, UV absorbers, fillers, and antioxidants may be added if desired.

The room temperature curable adhesives include silicone rubber adhesives, two part adhesives, and contact curing adhesives, with the silicone rubber adhesives being preferred in the practice of the invention.

By properly selecting the above-mentioned components, the physical properties of the adhesive layer can be controlled to fall within the desired range.

In applying the adhesive, a roll coater and other spreaders may be used. The adhesive may be applied to only one or both of a pair of substrates. After application, the adhesive coating is cured if necessary. It is also possible to attach a preformed sheet of the adhesive to a substrate and joining it to another substrate.

Preferably, the adhesive layer has a thickness of about 10 to about 100 μm, more preferably about 40 to about 80 μm. A too thin adhesive layer would provide an insufficient bonding power whereas a too thick adhesive layer would be less durable.

Construction of optical disc

Referring to FIG. 1, an optical recording disc is illustrated as one exemplary optical disc according to the invention. The optical recording disc includes a pair of disc units 10 joined through an adhesive layer 20. Each disc unit 10 includes a resin substrate 11 and a film laminate 12 containing at least a recording film on one surface of the substrate 11. The disc unit 10 further includes a protective film 13 covering the film laminate 12. The disc units 10 are joined through the adhesive layer 10 such that the film laminates 12 are disposed inside.

The resin substrates are transparent to write and read light and circular in shape. The resin substrate has a thickness t and a diameter d. The invention becomes effective when the d/t of the substrate is at least 180, especially at least 200, that is, when the ratio of diameter to thickness is extremely high. Most often, the thickness t of the resin substrate is about 0.4 mm to about 1.2 mm. Typically, both the resin substrates have the same thickness. The resin material of which the substrates are formed is not critical and may be properly selected from resins, for example, acrylic resins, polycarbonate, epoxy resins, polymethylpentene, and polyolefins.

The type of the recording film is not critical. Included are phase change type recording films such as InAgTeSb and TeGeSb systems, magneto-optical recording films such as TbFeCo and GdFeCo systems, and recording films containing organic dyes. In the case of phase change type recording films and magneto-optical recording films, a dielectric film containing at least one of various dielectric materials such as silicon oxide, silicon nitride and zinc sulfide is usually disposed on either side of the recording film in order to improve C/N and the corrosion resistance of the recording film. Also a reflective film of a metal such as Al, Au and Ag and alloys containing same is usually disposed between the dielectric film and a protective film. The film laminate 12 illustrated in FIG. 1 is comprised of such a recording film, a dielectric film, a reflective film, etc.

The protective film is provided for the purpose of improving corrosion resistance and scratch resistance. It is preferably formed from various organic materials. Preferably the protective film is formed by applying and curing a composition containing a UV curable compound.

Where the invention is applied to read-only optical discs, the resin substrate is provided with information carrying means in the form of pits as in CDs. Typically, a reflective film is formed on the information carrying means, and a protective film of resin is formed thereon.

Although the illustrated embodiment is an optical recording disc of the double-side recording type, the invention is also applicable to a one-side optical disc wherein the information carrying means is formed on only one resin substrate. The one-side type acquires the same advantages as the double-side type. The other resin substrate having no information carrying means, that is, protective substrate is preferably formed of the same resin composition to the same thickness as the one resin substrate having information carrying means.

It is understood that where a UV curable adhesive is used as the adhesive layer, a pair of disc units must be exposed to UV or electron radiation after joining. In order that a necessary dose of the UV or electron radiation irradiated from the surface of the resin substrate remote from the adhesive layer reach the adhesive layer, the thickness of the recording film and reflective film is properly determined. Since it suffices that at least one disc unit be transparent to UV and electron radiation, the protective substrate is formed of a material opaque to UV and electron radiation if desired.

The optical disc of the invention is generally driven at a rotational speed of about 200 to about 4,000 rpm.

EXAMPLE

Examples of the invention are given below by way of illustration and not by way of limitation.

Sample No. 101 (hot melt adhesive)

A polycarbonate substrate having a diameter (d) of 120 mm and a thickness (t) of 0.6 mm was prepared by injection molding and pits were simultaneously formed in its surface. The ratio (d/t) of diameter to thickness of this substrate was 200 as reported in Table 1. Aluminum was sputtered to form an aluminum reflective film of 100 nm thick on the substrate. A protective film of a UV curable resin was formed on the reflective film to a thickness of 20 $\mu$m, yielding a disc unit.

A hot melt adhesive was melted and applied to the surface of the protective film of the disc unit. A pair of such disc units were joined together to form an optical disc sample. The hot melt adhesive used herein contained a polystyrene-ethylene-butylene block copolymerized thermoplastic elastomer, a both end acryloyl-terminated (urethane acrylate type) hydrogenated polybutadiene oligomer, polyisobutylene, a hydrogenated styrene tackifier, and a photopolymerization initiator (benzyl methyl ketal). The adhesive layer was 50 $\mu$m thick.

Sample No. 102 (room temperature curable adhesive)

It was prepared by the same procedure as sample No. 101 except that a silicone rubber room temperature curable adhesive, RTV silicone rubber TSE392 by Toshiba Silicone Co., Ltd. was used.

Sample No. 103 (adhesive sheet)

It was prepared by the same procedure as sample No. 101 except that an adhesive sheet was used to construct the adhesive layer. The adhesive sheet was formed of a pressure-sensitive adhesive containing an acrylic base polymer and additives (including tackifier, softener, filler, antioxidant, crosslinking agent, etc.) like conventional pressure-sensitive adhesives, wherein the degree of polymerization was increased to improve heat resistance. The adhesive sheet was applied to only one substrate.

Sample No. 104 (UV curable adhesive)

It was prepared by the same procedure as sample No. 101 except that a UV curable adhesive containing urethane acrylate as a base component, a photopolymerization initiator and other additives was used and cured by UV irradiation.

Sample No. 105 (hot melt adhesive)

A disc unit was prepared by forming a lower dielectric film, a recording film, an upper dielectric film, a reflective film and a protective film on a polycarbonate substrate of the same dimensions as sample No. 101. The substrate was prepared by injection molding and grooves were simultaneously formed in its surface. The recording film was a phase change recording film of InAgTeSb alloy. A pair of such disc units were joined together to form an optical disc sample such that the recording films were disposed inside. The adhesive used was the same as in sample No. 101.

Sample No. 201 (hot melt adhesive)

It was prepared by the same procedure as sample No. 101 except that a hot melt adhesive AK-1 by Kanebo-NSC Ltd. was used.

Sample No. 202 (hot melt adhesive)

It was prepared by the same procedure as sample No. 101 except that a hot melt adhesive XW-13 by Toagosei Co., Ltd. was used.

Sample No. 203 (UV curable adhesive)

It was prepared by the same procedure as sample No. 101 except that a UV curable adhesive containing acrylic acid acrylate as a base component, a photopolymerization initiator and other additives was used.

Sample No. 204 (hot melt adhesive)

It was prepared by the same procedure as sample No. 101 except that a hot melt adhesive of a polystyrene-polyisoprene copolymer (molecular weight 100,000) was used.

Sample No. 205 (hot melt adhesive)

It was prepared by the same procedure as sample No. 204 except that both the substrates were 1.2 mm thick. The d/t of this substrate was 100 as reported in Table 1.

The adhesive layer of each sample had a Young's modulus and a mechanical dissipation factor (tanδ) at 20° C. as reported in Table 1. The Young's modulus and tanδ were measured by applying an adhesive onto release paper to a thickness of 300 μm by means of a roll coater. In the case of UV curable resin, the adhesive coating was cured by UV irradiation under the same conditions as in the manufacture of optical disc samples. The adhesive coating was stripped from the release paper. Using a viscoelasticity spectrometer manufactured by Iwamoto Mfg. K.K., it was measured for Young's modulus and tanδ at an exciting frequency of 10 Hz (sinusoidal wave). In the case of pressure-sensitive adhesive, a test sheet of 300 μm thick was prepared and similarly measured.

The samples were subject to the following test.

Vibration test

A disc sample was mounted on a spindle motor. The sample was rotated at 1,800 rpm while it received vibration simulating a running automobile. During rotation, an axial runout of the sample at its outer periphery (a displacement in a direction parallel to the axis of rotation) was measured. Such an axial runout was determined from a displacement of a lens of an optical pickup upon focusing servo control. (When the lens of the optical pickup is moved or focusing servo control is done so that a laser beam from the optical pickup may focus a constant spot at the rotating sample, the movement of the lens follows a variation of the disc. Then a variation of the disc is captured as a variation of the lens. That is, if the disc vibrates as a result of external vibration, the movement of the lens also changes. In this way, the vibration of the disc as a result of external vibration is measured from the movement of the pickup lens.) The position of measurement was the outermost circumferential track radially spaced 58 mm from the center. The applied vibration continuously varied from low frequency/high amplitude of 10 Hz×1 mm to high frequency/low amplitude of 100 Hz×100 μm in a duration of 5 minutes. The results are shown in Table 1. For comparison purposes, an axial runout was measured when the sample was rotated without applying vibration. It was reported as an initial axial runout in Table 1.

Heat resistance test

A disc sample was rotated for 300 hours at 1,800 rpm in an atmosphere of 60° C. and RH 30% before it was measured for average warpage angle. The results are shown in Table 1. For comparison purposes, the average warpage angle of the sample was measured prior to the heating test. It was reported as an initial value in Table 1.

TABLE 1

| Sample No. | Resin substrate d/t | Type | Young's modulus @ 20° C. (kgf/mm$^2$) | tanδ @ 20° C. |
|---|---|---|---|---|
| 101 | 200 | hot melt adhesive | 0.4 | 1.3 |
| 102 | 200 | RT curable adhesive | 0.12 | 2.0 |
| 103 | 200 | pressure-sensitive adhesive sheet | 0.5 | 1.5 |
| 104 | 200 | UV curable adhesive | 0.6 | 3.0 |
| 105 | 200 | hot melt adhesive | 0.4 | 1.3 |

TABLE 1-continued

| 201 (comparison) | 200 | hot melt adhesive | 0.04* | 3.8 |
| 202 (comparison) | 200 | hot melt adhesive | 9.0* | 0.5* |
| 203 (comparison) | 200 | UV curable adhesive | 2 × 10$^{10}$* | 0.1* |
| 204 (comparison) | 200 | h&t melt adhesive | 0.01* | 5.4* |
| 205 (comparison) | 100 | hot melt adhesive | 0.01* | 5.4* |

| | Vibration test Axial runout during rotation | | Heat resistance test Average warpage angle | |
|---|---|---|---|---|
| Sample No. | Initial (μm) | Under vibration (μm) | Initial (mrad) | 300 hr. @ 60° C./RH 30% (mrad) |
| 101 | 85 | 155 | 1 | 3 |
| 102 | 95 | 145 | 1 | 1 |
| 103 | 76 | 128 | 1 | 1 |
| 104 | 93 | 131 | 1 | 1 |
| 105 | 83 | 152 | 1 | 3 |
| 201 (comparison) | 65 | 115 | 1 | 5.2** |
| 202 (comparison) | 100 | 215** | 1 | 2 |
| 203 (comparison) | 110 | 220** | 1 | 1 |
| 204 (comparison) | 73 | 105 | 1 | 5.5** |
| 205 (comparison) | 98 | 130 | 1 | 1 |

*outside the scope of the invention
**in excess of the practically acceptable range (axial runout during rotation ≦ 200 μm, average warpage angle ≦ 5 mrad)

The effectiveness of the invention is evident from Table 1. In sample Nos. 101 to 105 wherein the Young's modulus and tanδ of the adhesive layer were within the scope of the invention, the axial runout during rotation in the vibration test somewhat increased, but fell in the practically acceptable range wherein no problems arise in write/read operation. It is thus believed that the adhesive layer suppressed axial runout by absorbing external vibrations. These samples experienced a little loss of mechanical precision because the long-term rotation in a hot environment caused only a little increase of warpage angle.

In contrast, sample Nos. 201 to 204 wherein the Young's modulus and/or tanδ of the adhesive layer was outside the scope of the invention were practically unacceptable in vibration resistance or heat resistance. Sample No. 205 showed acceptable vibration resistance and heat resistance because substrates having a lower d/t ratio were used. This indicates that the invention is effective when substrates having a high d/t ratio are used.

Japanese Patent Application No. 252364/1996 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. An optical disc comprising a pair of resin substrates, an information carrying means on at least one of the resin substrates, and an adhesive layer sandwiched between the pair of resin substrates so that the information carrying means is disposed inside, wherein each of the resin substrates has a thickness t and a diameter d wherein d/t is at least 180, and the adhesive layer has a Young's modulus of in the range of more than 0.1 kgf/mm$^2$ to 1 kgf/mm$^2$ at 20 degrees C. and a mechanical dissipation factor tan of 0.6 to 5.0 at 20 degrees C., whereby the adhesive layer having said Young's modulus and said mechanical dissipation factor provides an adhesive layer having improved heat resistance and vibration resistance than an adhesive layer not having said Young's modulus and mechanical dissipation factor.

2. The optical disc of claim 1 wherein said adhesive layer is formed of a hot melt adhesive.

3. The optical disc of claim 1 wherein said adhesive layer is formed of a pressure-sensitive adhesive.

4. The optical disc of claim 1 wherein said adhesive layer is formed of a room temperature curable adhesive.

5. The optical disc of claim 1 wherein said adhesive layer is formed of a ultraviolet curable adhesive.

6. The optical disc of claim 1 wherein the Young's modulus is 0.12 to 1.

7. The optical disc of claim 1 wherein the mechanical dissipation factor tan$\delta$ is 1.5 to 3.0.

* * * * *

UNITED STATES PATENT AND TRADEMARK OFFICE
CERTIFICATE OF CORRECTION

PATENT NO. : 5,936,934
DATED : 10 August 99
INVENTOR(S) : KURIBAYASHI ET AL.

It is certified that error appears in the above-identified patent and that said Letters Patent is hereby corrected as shown below:

Claim 1, column 9, line 2, delete "0.1 $kgf/mm^2$ to" and insert --0.1 $kgf/mm^2$ to--

Signed and Sealed this

Seventh Day of December, 1999

Attest:

Q. TODD DICKINSON

Attesting Officer

Acting Commissioner of Patents and Trademarks